United States Patent [19]
Phipard, Jr.

[11] 3,918,345
[45] Nov. 11, 1975

[54] THREAD FORMING FASTENERS

[75] Inventor: Harvey F. Phipard, Jr., South Dartmouth, Mass.

[73] Assignee: Research Engineering & Manufacturing, Inc., New Bedford, Mass.

[22] Filed: Oct. 31, 1966

[21] Appl. No.: 590,699

Related U.S. Application Data

[60] Continuation-in-part of Ser. No. 220,283, Aug. 29, 1962, abandoned, which is a division of Ser. No. 115,846, June 27, 1961, Pat. No. 3,195,156, which is a continuation-in-part of Ser. No. 819,167, June 9, 1959, abandoned, and Ser. No. 22,491, April 15, 1960, abandoned.

[52] U.S. Cl. .................................................. 85/46
[51] Int. Cl.² ....................................... F16B 25/00
[58] Field of Search................................. 85/46

[56] References Cited
UNITED STATES PATENTS

| | | | |
|---|---|---|---|
| 2,293,930 | 8/1942 | Braendel............................... | 85/47 |
| 2,352,982 | 7/1944 | Tomalis ................................. | 85/48 |
| 2,656,740 | 10/1953 | Bedken................................. | 85/47 |
| 2,807,813 | 10/1957 | Welles .................................. | 10/52 |

FOREIGN PATENTS OR APPLICATIONS

| | | | |
|---|---|---|---|
| 223,231 | 6/1956 | Japan..................................... | 85/47 |

*Primary Examiner*—Edward C. Allen
*Attorney, Agent, or Firm*—Olson, Trexler, Wolters, Bushnell & Fosse, Ltd.

EXEMPLARY CLAIM

1. In combination with apertured workpiece means, the provision of a thread forming fastener device particularly suitable for use with power drivers comprising:
   a. shank and work-entering end portions,
   b. a continuous rolled type thread on both said shank and end portions,
   c. means on the fastener for applying an outwardly acting axial load thereto when installed,
   d. the thread on said end portion being provided with a pitch surface which in cross section is of arcuate triangular lobular configuration having arcuate sides with intermediate arcuate lobes and each transverse cross section of such surface is of equal width throughout 360°,
   e. the thread on said end portion being provided with a series of circumferentially spaced apart lobes with the leading side of each lobe progressing from a point of minimum radial dimension from the axis between lobes which is less than the maximum radial dimension of the preceding lobe to a maximum radial dimension at the crest thereof which is greater than that of the preceding lobe defining a series of progressive thread swaging surfaces of increasing radius, thereby providing a relatively low driving torque for said device,
   f. the difference between the minimum and maximum radial dimensions of any cross section of the pitch surface of the thread on said shank being not substantially more than two-thirds the maximum depth of the thread, whereby when said device is axially loaded, the continuous thread of said shank portion may engage throughout 360° with the complementary mating thread formed during driving of said device into the workpiece means to provide a relatively high stripping strength for the device, and
   g. wherein the aperture in the workpiece means is of a size relative to the size of fastener such that the extent of swaging engagement between the swaging surfaces of successive lobes with the workpiece material amounts to approximately 25% or less of the peripheral extent of one turn of the screw thread to provide the relatively low driving torque.

2 Claims, 26 Drawing Figures

INVENTOR.
HARVEY F. PHIPARD, JR.

INVENTOR.
HARVEY F. PHIPARD, JR.

HARVEY F. PHIPARD, JR.
INVENTOR

BY Olson, Trexler, Wolters & Bushnell

HARVEY F. PHIPARD, JR.
INVENTOR

BY Olson, Trexler, Wolters & Bushnell

THREAD FORMING FASTENERS

This application is a continuation-in-part of my prior application Ser. No. 220,283, filed Aug. 29, 1962 and now abandoned. That application was filed as a division of my parent application Ser. No. 115,846, filed June 27, 1961, now U.S. Pat. No. 3,195,156, dated July 20, 1965, which was a continuation-in-part of my co-pending applications, Ser. No. 819,167 filed June 9, 1959, and Ser. No. 22,491 filed Apr. 15, 1960, both of which last-mentioned applications are now abandoned.

The present invention relates to self-tapping or thread-forming fasteners and the like devices, having a high differential between driving and failure torques making them especially suitable for use with power drivers.

Self-tapping fasteners fall into two broad classes, the first being those which are provided with cutting edges at the work-entering end, the second, and most common, being those which are so designed as to form threads with a swaging operation. Fasteners of the first type have the disadvantage that they all form chips which are cut from the body into which they are driven. While fasteners of the second type form no chips, they have other equally serious limitations. Depending upon the nature and hardness of the metal into which they are driven, fasteners of the second type require a high driving torque, particularly in metal greater than one-eighth inch in thickness so that the stripping torque to driving torque ratio is relatively low. High driving torque creates problems not only as regards manual drivability but a low driving torque to stripping torque ratio seriously restricts the usage of clutch controlled power drivers in assembly lines. It is well known that the driving torque of individual fasteners varies considerably due to the presence of any lubricant, slight variations in the material hardness into which the screw is driven, in the hole size, in the screw diameter, as well as dullness of cutting edges, or condition of driver bits. Similarly, failure torque, including stripping torque of the mating threads as well as the failure torque of the fasteners themselves, varies considerably from one fastener to the next. Also, clutch mechanisms of the power drivers cannot be relied upon to disengage at precisely the same torque value each time. If the driver clutch is set just above the normal driving torque, and any of these variations causes an increased driving torque, conventional tapping screws will not be driven fully home and loose assemblies result. If the driver clutch is so adjusted as to give a greater driving torque so as to overcome any such difficulty, conventional tapping screws will then frequently be over-driven, resulting in stripped threads or broken fasteners, either of which will result in costly delays of the assembly line while repair or replacement is made.

It is desirable, therefore, to have a high differential between the driving torque and the failure torque of the self-tapping fastener so that the clutch of the power driver can be set so that the fastener will consistently be driven home to a fully seated position and so that the driver will disengage each time well below the failure torque of the fastener. For example, with conventional tapping screws the stripping torque to driving torque ratio is ordinarily of the order of 3 to 1. With the screws of the present invention, this ratio may be increased to 6 to 1 or higher. This wide differential between the stripping torque and driving torque of the fasteners of the present invention has opened up new fields for usage of self-tapping fasteners.

It is a primary object of the present invention, therefore, to provide a new and improved self-threading fastener of the thread-forming or swaging type which forms threads in the workpiece without producing any chips, which has a substantially lower driving torque than comparable tread-forming devices heretofore, making it particularly suitable for use with power drivers.

A further object of the invention is to provide a new and improved thread-forming fastener having a relatively low driving torque and a relatively high failure torque so that the differential between such torques is greater than in the case of self-tapping screws provided heretofore, making it easier for the adjustment of automatic clutches of power drivers so that clutch disengagement can more readily be effected prior to failure of the fastener or threads formed thereby in the workpiece.

A still further object of the present invention is to provide a new and improved self-threading fastener whereby substantially full threads may be formed with a substantially perfect fit thereby resulting in a more perfect assembly due to the snug fit between the screw and the workpiece.

A still further object of the present invention is to provide a new and improved self-threading fastener having such a low driving torque that it is well suited for being driven into metal of any thickness, such as, into blind holes.

The above-mentioned objects are accomplished by making the threaded section of the thread-forming fastener device of arcuate triangular cross-sectional shape and having a predetermined difference between the minimum and maximum radial dimensions of the thread so as to secure the desired results. While Tomalis, U.S. Pat. No. 2,352,982, proposed threadforming screws of various different noncircular crosssectional shapes for use with plastics, in each instance the screws have flat sides which render all of the various shapes suggested entirely unsuitable for production on a commercial basis. While Welles, U.S. Pat. No. 2,807,813 provides a thread-forming tool of arcuate triangular cross section, his threads are ground upon a round cylindrical blank, a procedure obviously too costly for production of fasteners. More importantly, the Welles device is not a fastener but a tapping tool and is, of course, not adapted for axial loading. Neither is it concerned with the matter of ratio between stripping torque and driving torque.

The fastener devices of my herein disclosed invention may readily be manufactured on a mass production basis with machinery readily available and they also possess the superior performance characteristics recited above, namely, a high ratio between driving torque and failure torque.

For a consideration of what I believe to be novel and inventive, attention is directed to the following disclosure while the invention itself is pointed out with greater particularity in the appended claims.

In this application, the following definitions shall be applicable:

"Pitch surface" is used herein to designate the surface of revolution of the pitch line defining either the pitch cylinder or the pitch cone of a thread.

"Pitch surface cross section" is used herein to designate the transverse cross section of any pitch surface as of either the pitch cylinder or of the pitch cone. As applied to threads of the configuration herein described, the pitch surface cross section may be of arcuate triangular configuration.

Referring now to the view of FIG. 1, the invention will first be described with reference to a screw indicated generally at 20 having a driving head 21 and a straight thread formation 22 on the main shank portion 23 and a tapered thread formation 24 on the work-entering end 25 of the screw. Referring now to the end view of FIG. 2, it will be observed that the threaded portion of the screw is of noncircular, or lobular, shape and which may, for convenience, be termed an arcuate equilateral triangle. The configuration is characterized by three equally spaced lobes, 27, 28 and 29, separated by relatively broad arcuate sides 31, 32 and 33. The sides 31, 32 and 33 merge smoothly and continuously with the intervening lobes 27, 28 and 29, respectively.

Figures 1, 2:
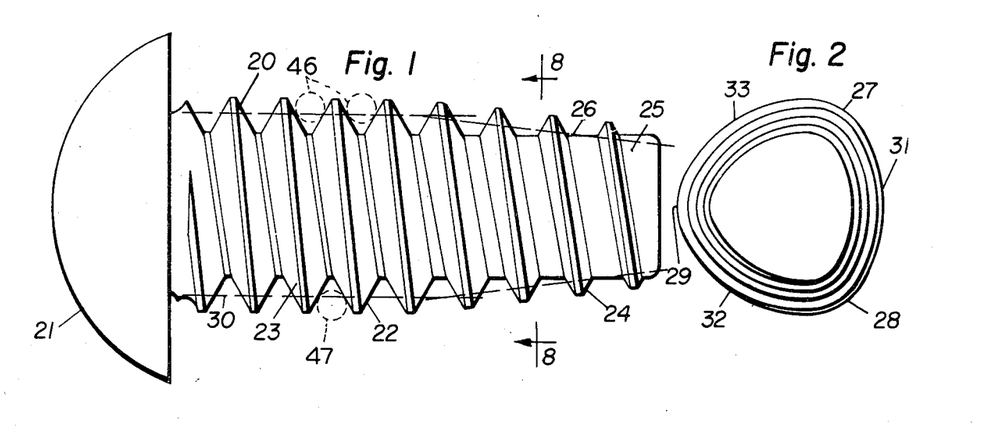
FIG. 1 is a side view of a thread-forming device according to one form of the present invention.
FIG. 2 is an end view of the device shown in FIG. 1.
Figure 3:
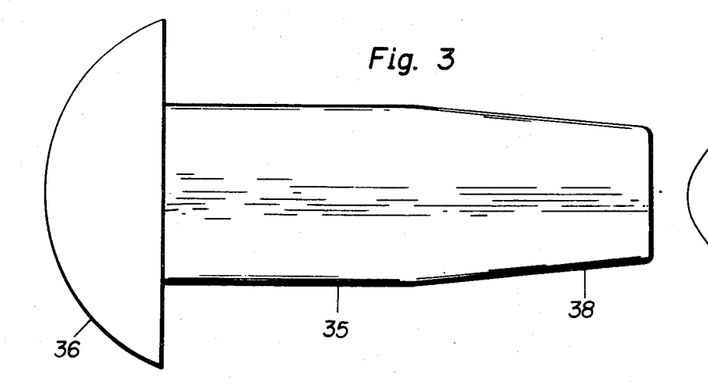
FIG. 3 is a side view of a blank used for making the device shown in FIG. 1.
Figure 4:
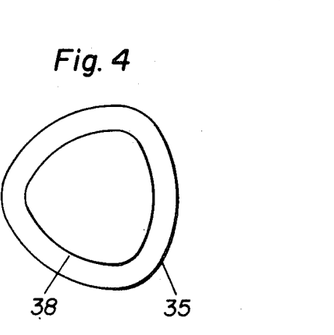
FIG. 4 is an end view of the blank shown in FIG. 3.

Referring now to FIGS. 3 and 4, there is illustrated a blank which is preformed for use in the manufacture of the screw illustrated in FIGS. 1 and 2. This blank includes a straight shank portion 35 having a driving head 36 at one end, which head may be provided with any driving means as desired, and a tapered end 38 at the other. As illustrated in the end view of FIG. 4, the blank is also of arcuate triangular shape similar to the configuration illustrated in FIG. 2. The blank can be formed from stock prepared by drawing a length of round wire through a forming or sizing die provided with a triangularly shaped orifice of a size and shape desired for the cross section of the blank as illustrated in FIG. 4. Stock material so formed can then be fed into a conventional cold heading machine wherein predetermined lengths may be severed and an end portion upset and headed. The heading punch can provide either a slot, recess or other driving means such as a hex head, as may be desired, in the upset head portion. During the heading operation, a taper 38 may simultaneously be formed on the end of the blank, in the event that such a taper is desired in the final article. Some types of fasteners, such as the forms of screws illustrated in FIGS. 20, 21 and 22 for example, do not require any such taper, however.

Figure 5:
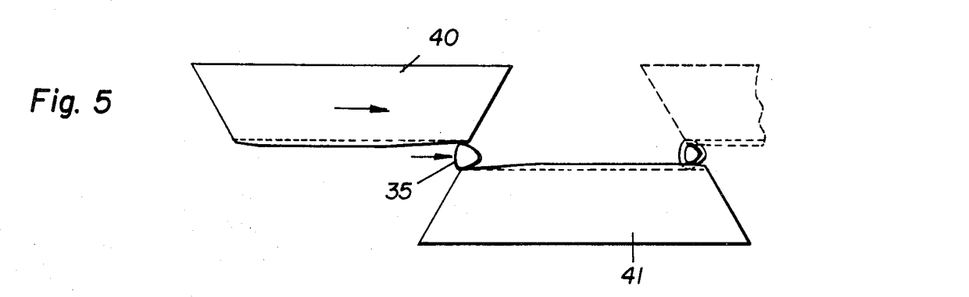
FIG. 5 is a schematic view illustrating the rolling of blanks between a pair of flat-faced thread-rolling dies.
Figure 6:
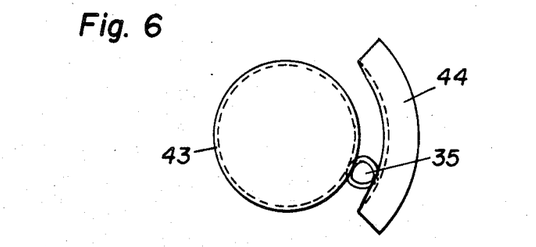
FIG. 6 is a schematic view illustrating a rotary thread roller.
Figure 16:
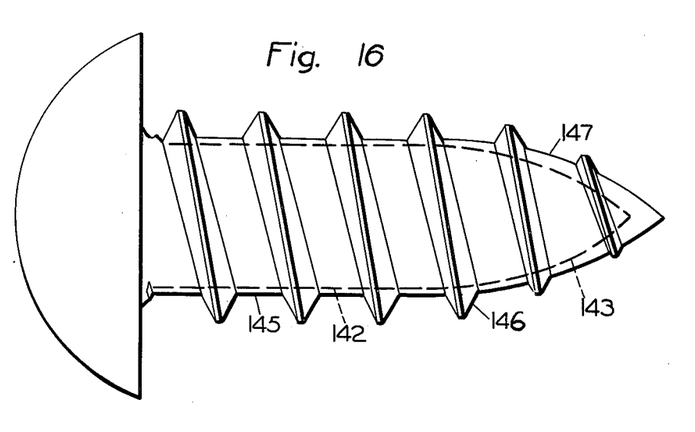
FIGS. 16 to 22, inclusive, are side and end views of different additional modifications of thread-forming devices constructed in accordance with the present invention.

With reference to FIG. 4, and as will be explained hereinafter, the transverse width of the blank as determined by a micrometer, is substantially constant throughout 360° around the blank even though it is not round so that a thread may be generated thereon with readily available centerless thread-forming machines. The blank 35 may be threaded between conventional, so-called flat thread-rolling dies 40, 41 as illustrated in FIG. 5. Alternatively, the threads may be formed by rolling the blank between a rotating die 43 and a stationary arcuate die 44 as shown in FIG. 6. The various thread-rolling machines indicated in FIGS. 5 and 6 are characterized by the fact that they all form threads on a centerless basis. Moreover, the opposed workpiece supporting surfaces are spaced a substantially uniform distance apart throughout the thread-forming operation and which is important for ease and economy of manufacture. It is to be understood, however, that some forms of conventional thread-forming dies referred to may be contoured to produce certain types of taper threads on the work-entering end, such as for example, the different types shown in FIGS. 1, 16 and 25, and are also slightly and uniformly inclined toward each other from the starting to the finish ends. As will be described in connection with FIG. 22, a taper sufficient for some purposes may be formed on a blank not previously tapered and with uncontoured dies. In all such thread-forming apparatus, the opposed thread-forming ribs of the cooperating dies are uniformly spaced from one another where they are adapted to roll the threads to final shape.

For further information regarding the method of manufacturing the herein described devices, reference may be had to my U.S. Pat. No. 3,195,156, entitled "Method of Producing Thread Swaging Devices."

Figure 7:
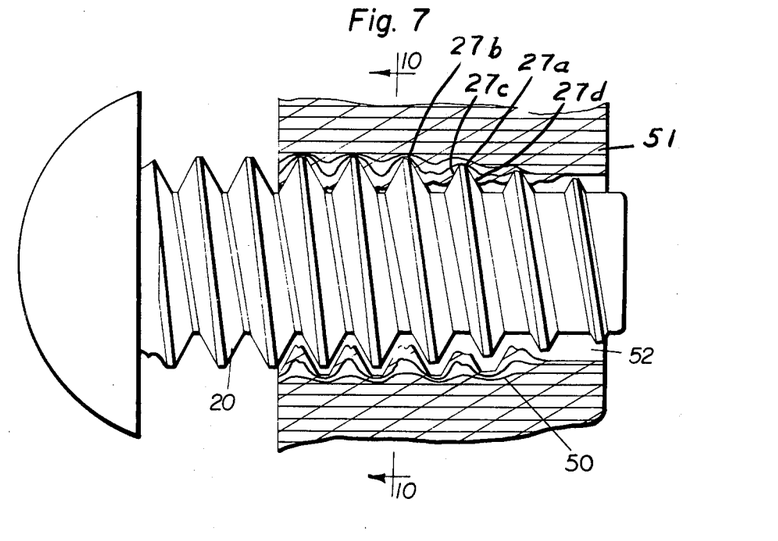
FIG. 7 is a view, partly in section, illustrating a screw driven into a body of metal.

Referring now to the view of FIG. 7 which illustrates the screw 20 being driven through a metal member 51, it will be observed that no metal is cut as the threads are formed in the side walls of the pilot hole 52 in the workpiece 51. Instead of being cut, the metal of the workpiece 51 is displaced by a swaging operation comparable to that in which threads are formed on a screw when passed between thread-rolling dies 40 and 41. It is well known to those skilled in the art that rolled threads are strengthwise superior to machined threads on account of the cold working and improved grain structure resulting from the rolling operation. For the same reason, the female threads formed in the side walls of the pilot hole 52 are provided with a grain flow comparable to the grain flow formed during a threadrolling operation, the grain flow lines being indicated at 50 in FIG. 7.

Figure 8:
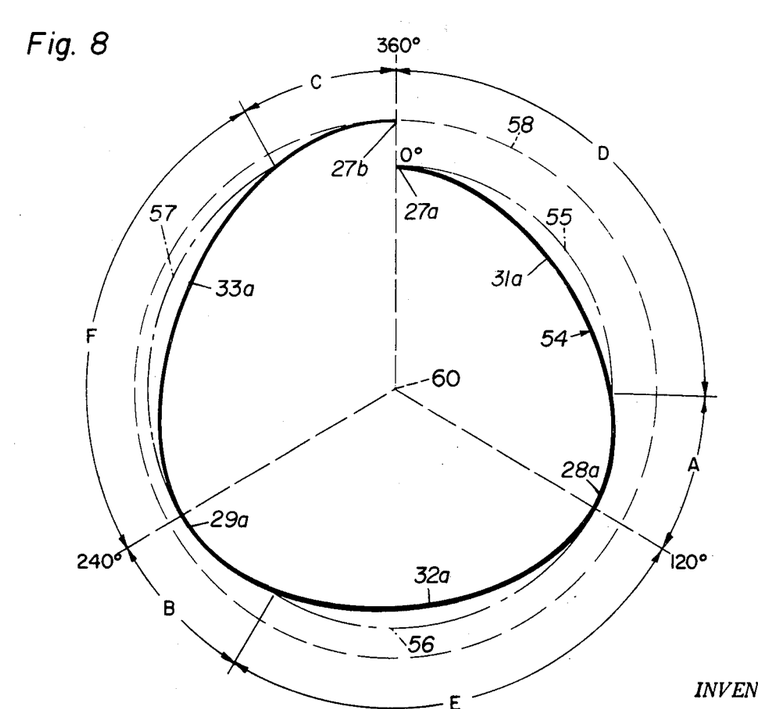
FIG. 8 is a diagram illustrating one convolution of a thread such as along the line 8—8 of FIG. 1.

The configuration of the thread on the work-entering end portion of the device shown in FIGS. 1 and 7 will now be described with reference to FIG. 8. In FIG. 8 the line 54 illustrates the peripheral or crest contour of a single spiral revolution of thread on the tapered end 24 of the screw 20, although, of course, the root of such thread will also be of the same shape. The root of the thread portion which will be formed in a workpiece, such as 51, by the crests of the lobes 27a, 28a and 29a, may be represented by the circular arcs 55, 56 and 57, the angular extent of which may be further represented by the arcs D, E and F. From the crests of the lobes the screw thread recedes from contacting engagement with the surfaces of the thread formed in the workpiece, as indicated by the spacing between the thread sides 31a, 32a and 33a and the arcs 55, 56 and 57, respectively, and hence there is no frictional contact throughout the entire extent of the arcs D, E and F. The working engagement of the lobes 28a, 29a and 27b with the workpiece material is indicated by the arcs A, B and C. The dotted circle 58 indicates the root diameter of the thread formed by a complete revolution of the lobe 27b. It will thus be seen that the screw thread over the work-entering end portion increases gradually and progressively from a minimum radial dimension from the screw axis 60, at a point such as 31a between the respective lobes which is less than the maximum radial dimension of the preceding lobe, to a maximum radial dimension at the crest of each successive lobe and which is greater than that of the preceding lobe.

Figure 9:
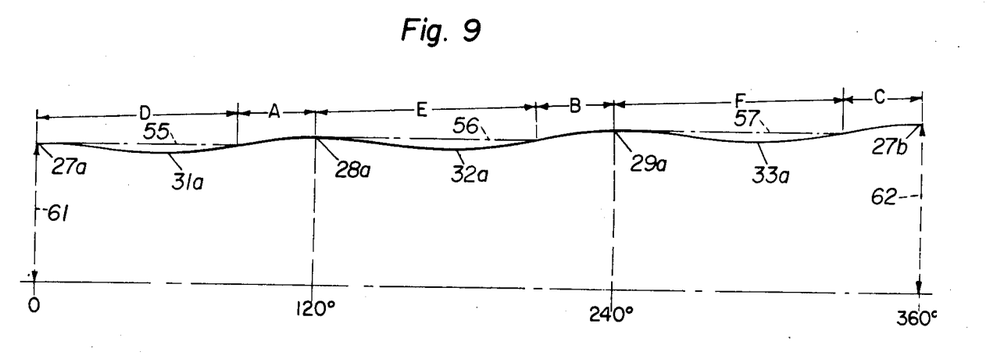
FIG. 9 is a planar projection of the spiral curve illustrated in FIG. 8.

FIG. 9 illustrates a planar projection of the single spiral revolution illustrated in FIG. 8. The successive thread lobe crests 27a, 28a, 29a and 27b are indicated. The starting radius, that is, the distance from the axis 60 of the screw to the crest of the lobe 27a, is indicated at 61 while the distance from such axis to the crest of the lobe 27b is represented at 62. The extent of working or swaging engagement of the successive lobes 28a, 29a and 27b with the metal of the workpiece may be represented by the distances A, B and C. It will be observed that the total engagement amounts to approximately 25% of the total peripheral extent of one turn of the screw thread. Due to the fact that approximately three-fourths of the screw thread is thus held out of engagement with the metal of the workpiece, the frictional drag, and hence the driving torque of the screw, is thus held to a minimum. For this reason, the screw as illustrated may readily be driven through relatively thick metal members with very low driving torque requirement. At the same time the angle of inclination of the thread portions over the distances A, B and C, is not so steep that they will cut chips from the workpiece being threaded. For convenience of description, reference was made heretofore primarily to the thread crests but, of course, during swaging operation the opposite flank or thread side wall portions, as indicated at 27c and 27d in FIG. 7, play a part equally important as that of the thread crest 27a. The leading surfaces of the lobes, including the crest and flank portions thereof, over the distances A, B and C thus slope gradually outwardly defining a series of thread-swaging faces having maximum radial dimensions as indicated, for example, at 61, 62, which increase progressively in the direction away from the tip and which account for the low driving torque of the device.

Figure 10:
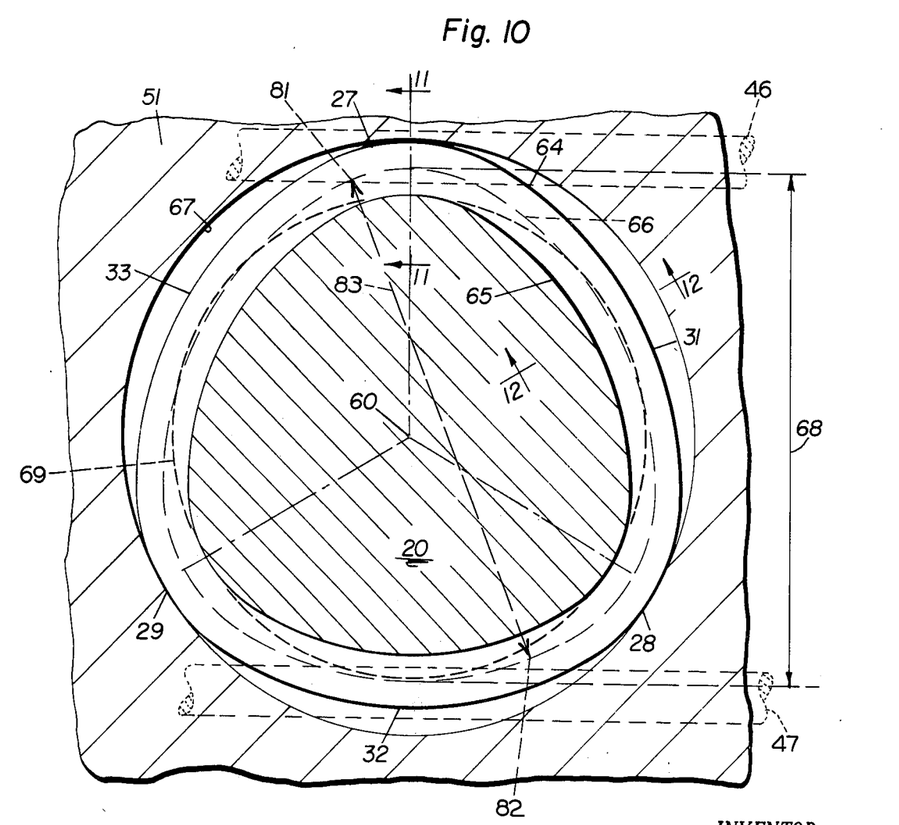
FIG. 10 is a view, somewhat schematic, taken along the line 10—10 of FIG. 7.
Figure 11:
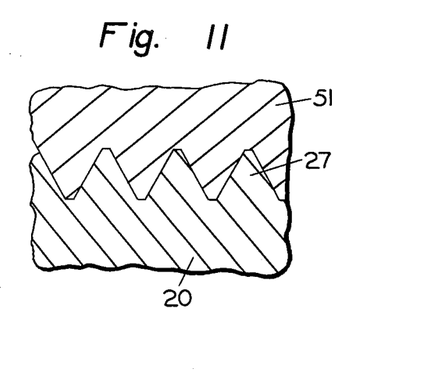
FIG. 11 is a view taken along the line 11—11 of FIG. 10.
Figure 12:
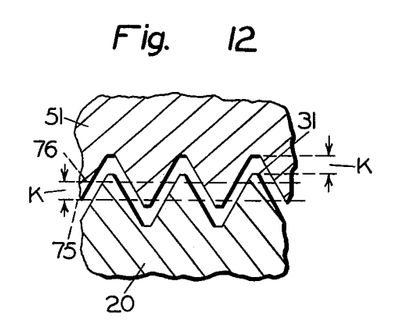
FIG. 12 is a view taken along the line 12—12 of FIG. 10.

In FIG. 10 is illustrated schematically a sectional view through the shank of the screw, and in which the line 64 indicates the peripheral, or crest edge of the screw thread, 65 indicates the root of the thread, while the dotted line 66 represents the pitch surface of the thread. The circles 67 and 69 represent the root and crest, respectively, of the completed mating female thread formed in a workpiece such as 51 and which are concentric with the screw axis 60. The radius of the circle 67 corresponds with the distance between the screw axis 60 and the outermost points on the thread lobes 27, 28 and 29. It will be obvious that during the unloaded condition of the screw, only the lobes 27, 28 and 29 will be in firm contacting engagement with the threads formed in the workpiece as indicated in FIG. 11. During such unloaded condition, the sides 31, 32 and 33 of the thread will be out of engagement with the adjacent thread in the workpiece 51 as illustrated in FIG. 12 on account of the out-of-round condition of the screw. Accordingly, during driving operation, and prior to the screw being driven fully home and axially loaded, frictional resistance between the screw and the work-piece is reduced to a minimum in the shank portion as well as in the tapered work-entering end portion as previously described.

The width of the pitch surface 66, illustrated in FIG. 10, is represented by the distance 68. This width or distance is substantially constant throughout 360°. The pitch surface width of an arcuate triangular threaded section may be measured by the three-wire method of measurement as described in the U.S. National Bureau of Standards Handbook No. H. 28 (1957). As therein described, the diameter of the wires 46 and 47 is selected so they will contact the flanks of the threads at the points coinciding with the pitch surface indicated at 30 in FIG. 1 and by the line 66 in FIG. 10. In the case of a uniform thread illustrated in FIG. 1, the contact points will, of course, fall at the midpoints of the sloping thread flank faces. With a suitable micrometer or other measuring device, having parallel plane gauge surfaces, the distance between the outer surfaces of the oppositely disposed wires may be measured. From this value, the pitch surface width 68 can be computed. Obviously, the line of measurement of the maximum width of the pitch surface will not always pass through the center of the cross section, or axis 60. For example, if the wires 46 and 47 were held stationary, and the screw 20 rotated, for example, through a 20° angle, so as to measure the width between points 81 and 82, the line of measurement 83 will be offset with respect to the axis 60.

The arcuate triangular configuration of the various cross-section of the blank, as illustrated, for example, in the end view of FIG. 4, or by the crest, root and pitch configurations illustrated by lines 64, 65 and 66 in FIG. 10, will now be described in greater detail and with particular reference to FIG. 14. The arcuate triangle there illustrated comprises broad sides 102, 103 and 104, each having a radius of curvature 105, pivoted about centers 91, 92 and 93, respectively. The points 91, 92 and 93 are located on a circle 94 about center 95, the determination of the radius of which circle will be described hereinafter. These sides merge smoothly and tangentially with intermediate arcuate lobes 108, 109 and 110, each having a radius of curvature 111 also pivoted about centers 91, 92 and 93, respectively. The lobes are internally tangential with respect to the circumscribed circle 114. The maximum clearance between the sides 102, 103 and 104 and the circumscribed circle 114 may be indicated by the distance 116 at the midpoint of such sides.

Figure 14:
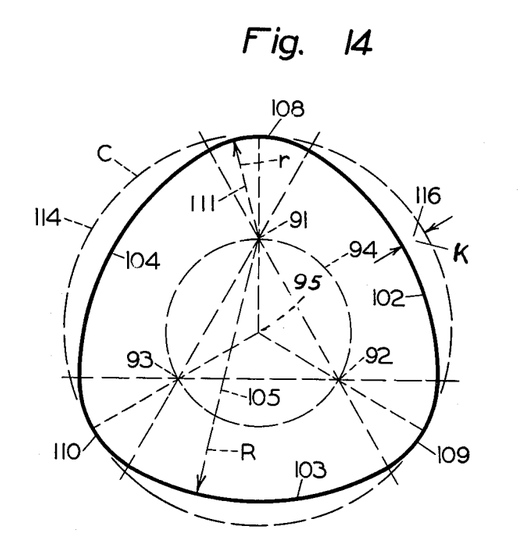
FIGS. 14 and 15 are diagrams illustrating the outlines of blank cross sections useful in the manufacture of devices in accordance with this invention.

A blank having a cross-sectional configuration comparable to that illustrated in FIG. 14 and which is of constant width throughout 360° will roll smoothly between a pair of conventional flat rolling dies. The lines measuring the maximum width of the arcuate triangle throughout the arcs 108 and 103 will all pass through the point 91 and that these lines will all equal in length the sum of the radii 105 and 111. Similarly, throughout the remaining sections of the triangle, all lines measuring maximum width will pass through either points 92 or 93. Such lines in turn will each equal in length the sum of the radii 105 and 111. This relationship will hold true notwithstanding the amount of clearance or deviation provided as indicated at 116 and which may be varied as desired. During the rolling operation, threads can readily be completely formed over the sides 102, 103 and 104 as well as across the lobes 108, 109 and 110. Moreover, only a minimum of deviation will occur in cross-sectional shape between that shown in FIG. 14 for the blank and that of the pitch surface of the finished screw. This is a distinct advantage insofar as commercial practice is concerned since it is thus possible to predict and design in advance, within reasonably close limits the final cross-sectional shape of the screw by corresponding design of the blank.

In the case of rolled threads, the volume of metal which will be raised above the surface of the blank will correspond to the volume of the grooves formed in the blank between the raised thread portions. Accordingly, the blank configuration illustrated in FIG. 14 will conform rather accurately to that of the pitch surface of the finished thread. In other words, the pitch surface of the finished thread which will be formed by rolling a blank of the shape shown in FIG. 14 between a pair of conventional thread-rolling dies, as previously described with reference to FIGS. 5 and 6, will conform to the configuration illustrated in FIG. 14 and will have a width which is constant throughout 360°.

In designing the cross-sectional configuration of a blank for any given size of screw, I prefer to employ the following formulas:

$$R = \frac{C}{2} + 2.741\,K \quad (1)$$

$$r = \frac{C}{2} - 3.741\,K \quad (2)$$

In the above formulas, R equals the radius of curvature 105 of the broad sides such as 102, 103 and 104; r equals the radius of curvature 111 for the lobular portions such as 108, 109 and 110; C equals the diameter of the circumscribed Circle 114 to which the lobular portions are internally tangential; and K is the amount the sides of larger radius depart from such a circle, and as indicated by the distance 116. For practical expediency, the fractions 2.741 and 3.741 may be converted to whole numbers 3 and 4, respectively, for use in designing small size blanks. Once the value of K has been determined, a circle 94 having a radius of 3.741, or four times K, may be drawn about the center 95 so as to locate points 91, 92 and 93.

Figure 15:
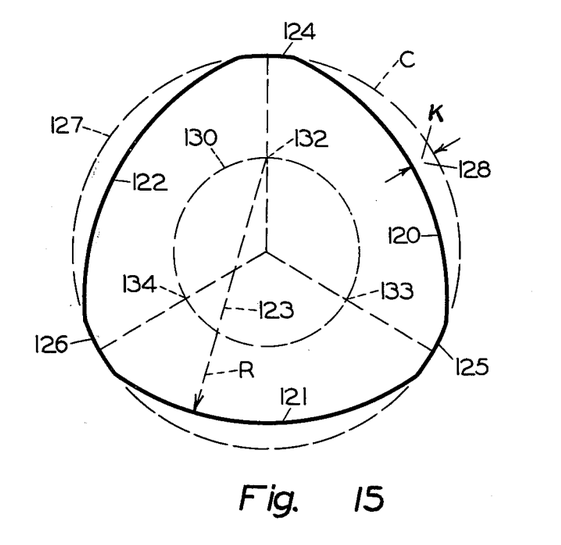

In the manufacture of certain products where high precision is not required, or in the case of screws of relatively small size, such as ¼ inch and smaller, I have found it feasible to omit the small radius r in the design of the blank, as illustrated by FIG. 15. In this case, the sides 120, 121 and 122 have the same radius of curvature 123 pivoted about points 132, 133 and 134, as the corresponding sides in FIG. 14 or in other words the radius 123, or R, is equal in length to the radius 105. I have also found it satisfactory to use the formula $$R = \frac{C}{2} + 3\,K$$

in such instances as suggested above. In the case of the blank, the lobular portions will be defined by sides 124, 125 and 126 which are concentric about the axis of the blank or, in other words, segments of the circumscribed circle 127 which, for the conditions assumed, is the same diameter as the circle 114. The amount of clearance, K, between the sides 120, 121 and 122, and the circle 127, indicated at 128, is the same as the clearance 116.

It will be observed that the blank shape illustrated in FIG. 15 conforms very closely to the shape illustrated in FIG. 14 or, in other words, the deviation occasioned by the concentric portions 124, 125 and 126 as distinguished from the portions 108, 109 and 110 of lesser arcuate curvature is so slight as to be hardly noticeable, and especially in the smaller sized screw blanks. After the thread-rolling operation, however, this minor discrepancy disappears entirely in that the cross-sectional shape of the pitch surface of the finished screw will conform to the shape illustrated in FIG. 14. In the finished screw, no part of the lobes will be concentric with the screw axis.

The factor K employed in the above formulas, that is, the maximum amount of clearance between the threads of the screw and the mating threads formed thereby in the workpiece, is indicated in FIG. 12. The extremities of the threads, that is, the crests and roots, are illustrated as being perfectly formed, but such a condition is seldom true in accordance with accepted commercial thread-rolling practice. Usually, these extremities are imperfectly formed and consequently they do not provide reliable reference points for the determination of the amount of the factor K. It is preferred, therefore, to refer to the pitch surfaces instead. In FIG. 12 the pitch surface for the screw 20 is indicated by the dotted line 75 while the pitch for the female thread formed in the workpiece 51 is indicated by the dotted line 76.

Figure 13:
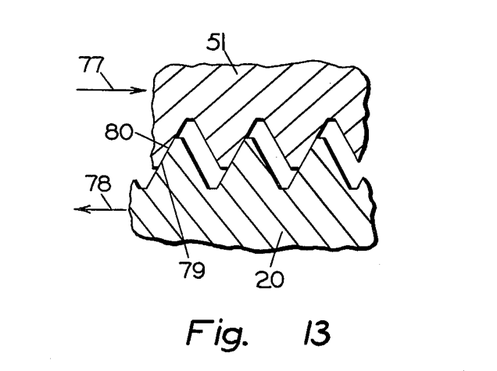
FIG. 13 is similar to FIG. 12 but illustrates the screw in the axially loaded condition.

While the value of the factor C in the above formulas is determined by the size of the screw to be provided, the value of the factor K may be varied as desired. The optimum value for the factor K is arrived at as a compromise between two opposing conditions. The greater the amount of K, the lower will be the frictional resistance between the threads of the screw and the workpiece, and hence the lower will be the driving torque. On the other hand, the smaller the amount of K, the greater will be the stripping torque and holding power of the screw. Referring again to FIG. 12, it should be noted that the condition illustrated therein represents the unloaded condition of the screw relative to the workpiece 51. FIG. 13 represents the axially loaded condition, that is, with the screw 20 driven home tightly the axial loading being represented by the force vectors 77 and 78 extending in the axial direction. During such a loaded condition, the lobular portions of the screw will be forced into the mating female threads in the workpiece 51 until the flanks 79 of the screw 20 are drawn into substantial engagement with the corresponding adjacent flanks 80 of the female thread throughout 360°. Due to such thread engagement when in the axially loaded condition, high holding strength is provided as well as a high failure torque during driving. The greater the amount of overlap between the flanks 79 of the screw and the adjacent thread flanks 80 of the workpiece, as shown in FIG. 13, the greater will be the holding strength and failure torque.

The value selected for the factor K may be varied somewhat depending upon the size of the screw being manufactured and other factors. Through experimentation, I have determined that the following values for K for the most common screw sizes provide an excellent compromise between the low driving torque on the one hand, and high stripping torque, or holding power, on the other hand, and with a wide differential therebetween providing an ample range within which automatic clutches for power screw drivers can be adjusted for insuring that the screws may be driven firmly home before disengagement of the clutch and at the same time being assured that disengagement of the clutch will take place before the threads are stripped.

| Screw Size | Value of K (inches) |
| --- | --- |
| 2 | .0035 |
| 3 | .004 |
| 4 | .005 |
| 6 | .006 |
| 8 through 5/16 | .009 |

I have found it preferable to use a value of K corresponding approximately from one-fourth to two-thirds of the thread depth in order to obtain a high value of holding power per thread and at the same time provide for low driving torque. While the limits are not critical, the amount of overlap at the low points of the sides of the screw should be at least approximately one-third of the thread height. Stated in another way, for most applications the difference between the distance from the axis to the farthest points on the lobes of the pitch surface and the distance from axis to the nearest points on the sides of the pitch surface of the fastener thread should not be substantially greater than two-thirds of the thread height nor substantially less than one-fourth such thread height.

Summarizing the above, the finished threads of the fastener device have pitch surface cross sections of arcuate triangular shape having sides provided with a radius of curvature which is greater than the radius of a circle circumscribing the pitch surface cross sections tangentially with respect to the crest of the lobes thereof by an amount which is equal to approximately three times the distance that the midpoint of the sides are spaced inwardly from such circle. The space between the midpoint of the sides and the circumscribed circle may vary from approximately one-fourth to two-thirds the normal thread height, it being understood, however, that such limits are preferred but are not critical.

Figure 17:
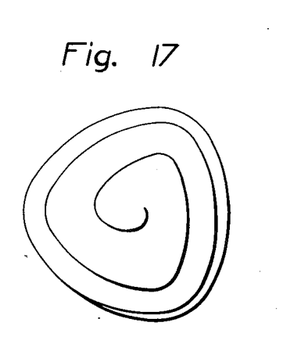

From the description given, it will be obvious that the present invention is adaptable to various different conventional forms of thread-forming fastener devices. The screw illustrated in FIG. 1 has a thread formation of the vanishing type in that, on its work-entering end portion 25 it is characterized in any axial plane by a constant root diameter and progressively decreasing outside and pitch diameters. In the modification illustrated in FIGS. 16 and 17, the screw 145 is provided with a thread formation 146 which is also of the vanishing type on the end portion thereof. The thread in the work-entering end portion 147 is further characterized, in any axial plane, by decreasing root, pitch and outside diameters. The pitch surface of the thread formation on the shank is indicated by the dotted lines 142. The pitch cone of the work-entering end portions is indicated by the dotted lines 143. It will be noted that the inwardly tapering sides of the cone, as viewed in longitudinal section, are curved rather than straight. Both the pitch surface 142 and the pitch cone 143 are of lobular cross-sectional configuration, similar to the perimeter of the end view of FIG. 17, and moreover, every transverse cross section of such pitch surfaces is of equal transverse width throughout 360°.

Figure 18:
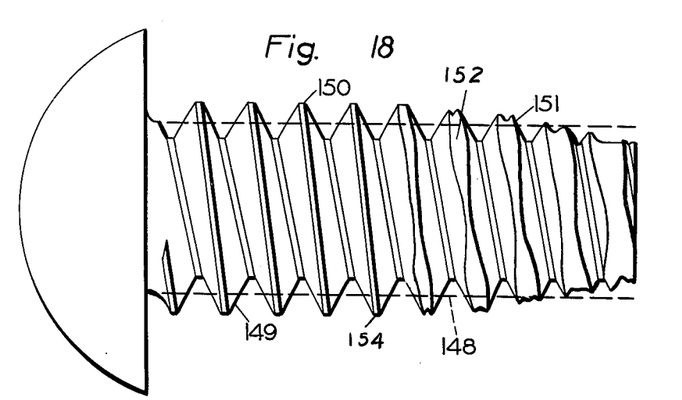
Figure 19:
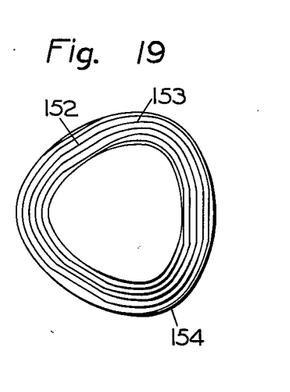

In FIGS. 18 and 19 is illustrated a screw 149 having a thread formation 150 which is finished or completely formed in its main shank portion but which is unfinished on its workentering end portion 151. The thread formation in any axial plane is characterized by a constant root and pitch diameter and on the work-entering end it has a tapered, or a decreasing, outside diameter. The pitch surface of the thread formation 150 and 151 is indicated by dotted lines 148. The pitch surface is of lobular cross-sectional configuration, similar to the end view of FIG. 19, and is of equal transverse width throughout 360° throughout the entire length of the shank and work-entering end portions. Notwithstanding the fact that the thread crests are unfinished, as indicated at 152 particularly at the tip end of the work-entering portion, the peripheral contour of at least the last thread of such portion conforms substantially to the configuration illustrated and described with reference to FIG. 8. Insofar as the tip end of the work-entering end portion is concerned, it is immaterial as to whether the crests of the threads are entirely finished. However, the radial extent of the thread surfaces on the leading sides of the last few lobes of the workentering end should increase gradually and smoothly to the maximum radial extent of the thread on the shank adjacent thereto as further shown at 154 in FIG. 19 and as previously described.

Figure 20:
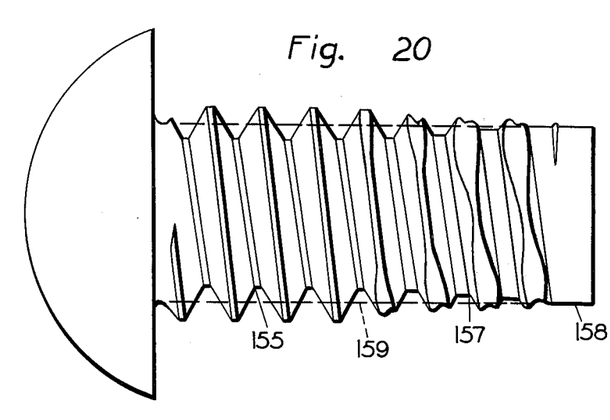
Figure 21:
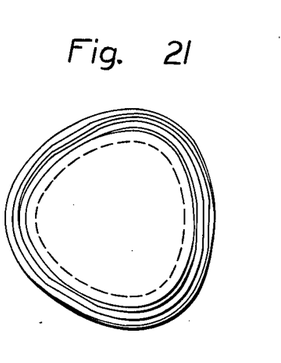

In FIGS. 20 and 21 is illustrated a further form of screw 155 which is provided with a finished thread over its main shank portion and an unfinished thread over its work-entering end portion 157. This screw, in any axial plane, in its workentering end portion 157, has a constant pitch diameter while the root diameter increases in the direction toward the outer end 158 while the outside diameter progressively decreases toward the same outer end. The pitch surface of the thread formation throughout the entire length thereof is indicated by dotted lines 159. This pitch cylinder is of lobular cross-sectional configuration and is of equal transverse width throughout 360° throughout both the shank and work-entering end portions. The device in this instance is formed through the use of contoured thread-rolling dies in conjunction with an untapered blank, that is, a blank of lobular cross section but of uniform transverse width throughout its entire length. This screw is of the so-called captive type in that when it is threaded into a pilot hole having a diameter only slightly larger than the extremity 158 of the screw, the female thread formed in the workpiece increases progressively at a rate comparable to the decrease in the root diameter of the thread of the screw so that the thread when fully formed in the workpiece has an internal crest diameter which is smaller than the diameter of the screw end In FIG. 22. is illustrated a threaded portion of a further form of a fastener device 170 of arcuate triangular cross section as previously described having a thread with a constant root and pitch diameter. In this instance, the taper on the work-entering end 172 exists only upon one thread turn or less, as indicated at 174. The slight amount of taper indicated at 174 results from metal fall-away at the unsupported, free end of the blank during the thread-rolling operation.

Figure 22:
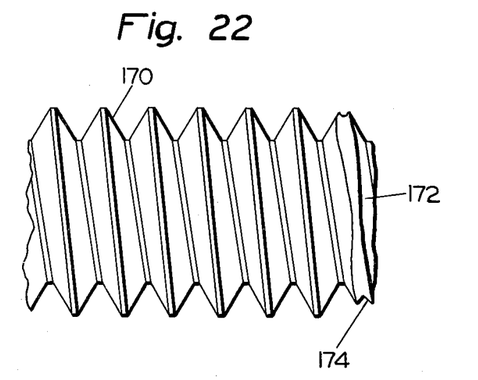
Figure 23:
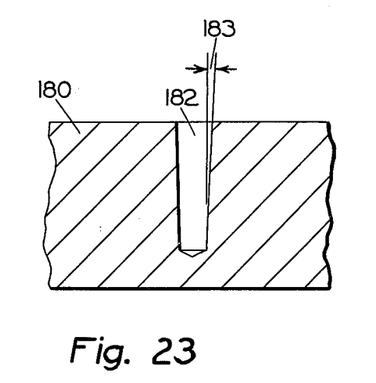
FIG. 23 is a fragmentary view in cross section illustrating a portion of a casting.
Figure 24:
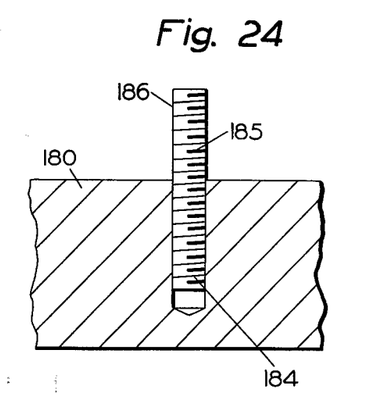
FIG. 24 is a view similar to FIG. 23 but showing a stud of the present invention installed therein.

Only a slight amount of taper, as indicated in FIG. 22, is needed in certain situations, such as for example, in connection with cored holes in cast metal parts, the side walls of which may be provided with a slight amount of taper for facilitating the withdrawal of the core. In FIG. 23 is illustrated a portion of a casting 180 having a cored hole 182 formed therein, the side wall of which has a relatively slight taper as indicated by the angle 183 and which may be of the order of 1° or 2°. In FIG. 24 is illustrated the same casting portion having a stud 185 driven therein. It will be obvious, that in the case of a tapered hole such as 182, the work-entering end 184 of the stud 185 need have only a slight amount of taper as shown at 174 in FIG. 22.

The end portion 186 of the stud 185 protruding from the casting 180 may be threaded with any form of thread desired. The stud may be of the same arcuate triangular cross-sectional configuration throughout and the tip of the end 186 may be provided with the slight amount of taper as is indicated at 174 in FIG. 22, or any other degree of taper as desired. On the other hand, the thread portion 186 may be of round cross-sectional configuration for receiving a conventional machine nut for securing another part to the casting. In any event, the thread portion 186 of the stud constitutes a means whereby the threaded portion driven into the casting 180 may be loaded in the axial direction during the fastening of another part to the casting 180, thereby to bring the arcuate triangular threads of the stud into engagement with the mating threads in the casting substantially throughout 360° as previously described.

Figure 25:
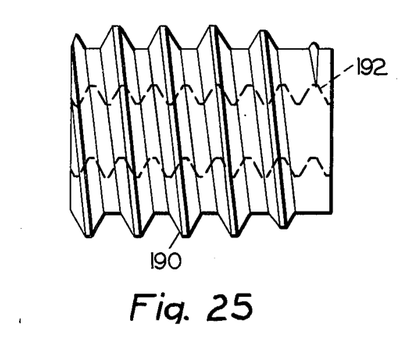
FIG. 25 is a side elevation illustrating an internally threaded insert of the present invention.

In addition to screws and studs referred to above, this invention may also be applied advantageously to such devices as internally threaded inserts shown, for example, at 190 in FIG. 25, in which instance the external surface of the insert is provided with a continuous thread of arcuate triangular configuration as previously described for facilitating the driving of the insert into the workpiece. The internal thread 192 is of circular cross section, and like the threaded portion 186 of the stud shown in FIG. 24, constitutes means for axially loading the external thread as previously described.

Figure 26:
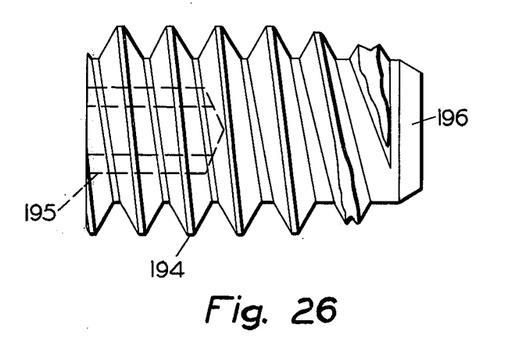
FIG. 26 is a side elevation of a set-screw in accordance with the present invention.

The invention is also suitable for use in connection with set-screws, a typical application being for fastening a hub onto a shaft. One such set-screw is shown in FIG. 26 at 194, which is externally threaded as previously described and provided with a socket 195 for cooperatively receiving a driver. The shaft-engaging end 196 constitutes means for axially loading the device when installed.

As is well known to those skilled in the art, it is customary when tapping a hole with a tapping tool to provide a certain amount of clearance between the female threads of the tapped hole and the threads of the machine screw to be installed therein. In order to retain the machine screw in the fully seated position and against loosening under vibration, it is common practice to use a lock washer underneath the head. In the case of fastener devices of the present invention, a perfect fit occurs in every instance between the thread of the fastener device and the female thread formed thereby. Due to this close fitting relationship a high backout characteristic is retained by the screw so that it has generally been found unncessary to use lock washers with the fastening devices of the present invention. This high back-off torque is retained after many driving and removal operations. For example, in laboratory tests using a steel plate of one-eighth inch thickness, a screw in accordance with the present invention size ¼-20 was first driven home and tightened with a tightening torque of 40 in lbs. The back-off torque for the first removal operation was measured at 25.5 in. lbs., whereas, for the twentieth removal operation, the back-off torque was measured to be 29.0 in. lbs. Such a characteristic is quite consistently true, that is, the back-off torque increases slightly after repeated removal, and renders these screws particularly suitable for use as set-screws which are customarily subjected to heavy vibration and other stresses tending to cause the screws to work loose. In most instances lock washers cannot be used with such screws.

Moreover, due to the closeness of fit between the threads of the fastener devices of the present invention and the mating threads formed thereby in a workpiece, it has been found that the present devices provide a stripping strength up to three times that of conventional machine screws of the same size when assembled in a workpiece of a thickness in the range beyond that necessary to provide two and one-half to three threads engagement.

From the foregoing description, it will be noted that the threads on all of the various modifications of fastener devices herein referred to are produced in their final shape by the simple thread-rolling operation. No further slotting, milling or machining operation need be performed upon the threaded portion of the device. All that remains to be done is heat treatment and plating, such as with cadmium, zinc, or the like, which finishing steps are usually provided upon self-tapping devices.

Having described my invention in what I consider to be preferred embodiments thereof, what I claim as my invention is:

1. In combination with apertured workpiece means, the provision of a thread forming fastener device particularly suitable for use with power drivers comprising:
   a. shank and work-entering end portions,
   b. a continuous rolled type thread on both said shank and end portions,
   c. means on the fastener for applying an outwardly acting axial load thereto when installed,
   d. the thread on said end portion being provided with a pitch surface which in cross section is of arcuate triangular lobular configuration having arcuate sides with intermediate arcuate lobes and each transverse cross section of such surface is of equal width throughout 360°,
   e. the thread on said end portion being provided with a series of circumferentially spaced apart lobes with the leading side of each lobe progressing from a point of minimum radial dimension from the axis between lobes which is less than the maximum radial dimension of the preceding lobe to a maximum radial dimension at the crest thereof which is greater than that of the preceding lobe defining a series of progressive thread swaging surfaces of increasing radius, thereby providing a relatively low driving torque for said device, f. the difference between the minimum and maximum radial dimensions of any cross section of the pitch surface of the thread on said shank being not substantially more than two-thirds the maximum depth of the thread, whereby when said device is axially loaded, the continuous thread of said shank portion may engage throughout 360° with the complementary mating thread formed during driving of said device into the workpiece means to provide a relatively high stripping strength for the device, and g. wherein the aperture in the workpiece means is of a size relative to the size of fastener such that the extent of swaging engagement between the swaging surfaces of successive lobes with the workpiece material amounts to approximately 25% or less of the peripheral extent of one turn of the screw thread to provide the relatively low driving torque.

2. The combination of claim 1, wherein there is left approximately 75% of the screw thread out of engagement with the workpiece material during threading, whereby permissive stripping torque to driving torque ratios of the order of 6 to 1 may be attained.

* * * * *